Patented July 28, 1936

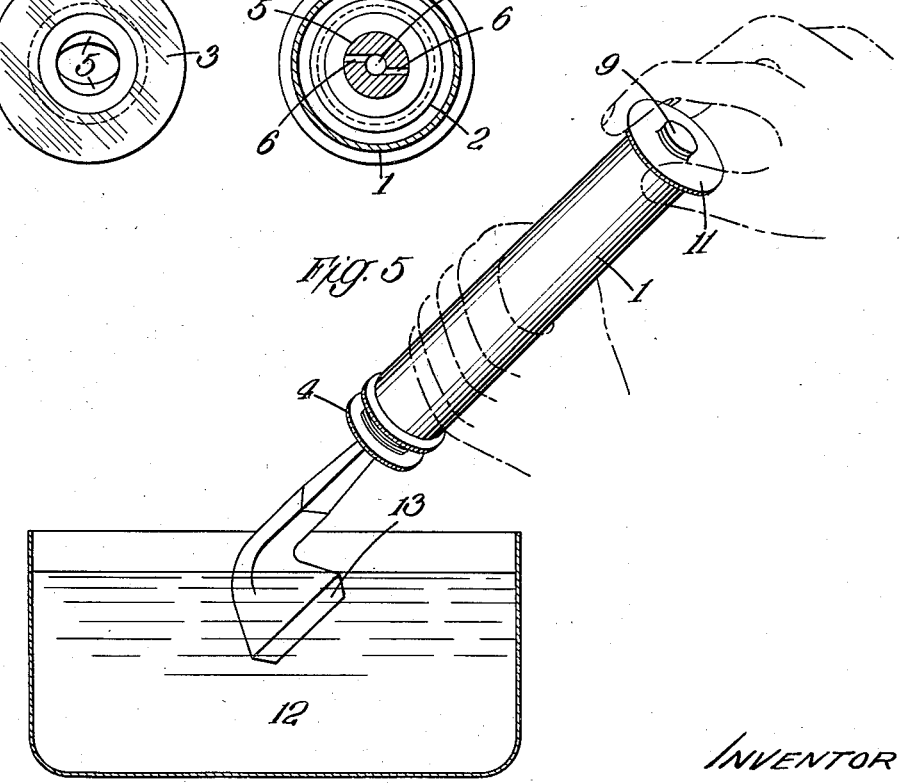

2,049,196

UNITED STATES PATENT OFFICE 2,049,196

DEVICE FOR CLEANING TOBACCO PIPES, CIGARETTE-HOLDERS, AND THE LIKE

Richard Roland Croft, Mile End, Portsmouth, England

Application September 26, 1934, Serial No. 745,590
In Great Britain October 10, 1933

3 Claims. (Cl. 131—13)

This invention relates to means for spraying and cleaning the bore or stems of tobacco pipes, cigarette-holders and the like, and is of the type in which a cylinder or barrel fitted with a movable piston is employed for forcing a jet of cleansing liquid through the bore or stem to clean it.

The object of the invention is to provide an efficient and inexpensive device of the above nature whereby a stream of water, hot or cold, or other suitable liquid can be sprayed, pumped or forced through the stems and bowls of tobacco pipes, or through the stems of cigarette-holders and the like of any size or shape.

It is well known that with continued use a pipe or holder becomes foul which makes it necessary, for reasons of health, that the foul or poisonous deposit should be removed.

By the use of my invention the removal of the foul or poisonous deposit can be effected and the pipe or holder made clean and wholesome again.

According to my invention I employ a cylinder, preferably fluted on the outside surface to give a firm hand-hold, and fitted internally with a gland or bush having a plug of rubber or other suitable material, made with a central passage of oval formation at the entrance and circular at the other end so as to receive and hold the mouthpiece of the pipe or holder, to make an air-tight and water-tight joint when the plug is put under compression, holes, in angular relation with the central passage of the plug, being provided in the inner end of the gland or bush and leading into a central hole formed in the inner end of the said gland or bush, but not through it, in line with that of the plug and stem to allow the liquid in use, when cleaning to enter and escape in a rotary, or whirling manner to clean the bore. In co-operative relation with the said gland or bush a gland-nut is used by which pressure can be imparted to the plug to make an air and liquid tight-joint between it and the gland.

At the opposite end of the cylinder a tubular member or bush is fitted therein and intermediate to it and the said gland or bush is located a hollow plunger which has a piston like motion, the stem of which is provided with a quick running thread which takes into a complementary thread provided in the tubular member or bush. The tubular member or bush is arranged to operate as a hand-wheel by which a rotatory motion, to give the required length of travel, can be imparted to the plunger for suction or conversely discharge, similar to a force-pump, and cause the liquid taken from a vessel in close connection, to be squirted or propelled through the stem of the pipe or holder to clean it.

Rustless metal is used in the construction of the cleaner.

The accompanying drawing illustrates an embodiment of the invention.

In the drawing:—

Fig. 1 is a front elevation of the cleaner.

Fig. 2 is a sectional elevation of Fig. 1.

Fig. 3 is a front view, taken at the line 3—3, of the gland or bush carrying the compressible plug.

Fig. 4 is a front view of the said plug, and

Fig. 5 is a perspective view showing the cleaner held in position by hand, when in use.

Referring to the drawing, 1 is a cylinder into which the gland or bush 2 is fitted and 3 is a plug of flexible or pliable material lodged therein and placed under compression, to form a tight-joint with the gland 2, by a gland-nut 4. The plug 3 is made with a circular chamber 7$^a$ and oval central passage 5 to hold the pipe stem, and the gland or bush 2 has a hole 6$^a$ in but not through it and also has angular holes 6 off-set from the hole 6$^a$ but communicating with it.

The broken lines show the position of the stem 7 to be cleaned.

The hollow piston 8 is made as thin as possible so as to expand, under pressure discharge, to make a non-leaking wearing surface with the bore of the cylinder, and is movable in the cylinder 1 by the screwed stem 9, which takes into the tubular member or bush 10, which is operable by rotating the milled flange, or wheel 11, which may be of capstan type, and this action also actuates the piston 8.

12 is a bowl containing the cleansing liquid into which the pipe bowl 13 dips during cleaning.

After the pipe has been cleaned or sprayed out the cleaner with the pipe in place should be held level and then the same motion carried out again when the pipe will be dried out with compressed air.

I claim:

1. A device for cleaning a holder for tobacco having a cylinder fitted internally with a bush and a plug having a central passage through it substantially oval shaped at one part and provided with a circular chamber at another part, both being adapted to receive and hold the stem of a holder to be cleaned, a plurality of holes, in angular relation with the central passage, formed in the inner end of the bush which lead to the central passage in the inner end of the bush in line with that of the plug for the passage of the cleaning liquid, and a piston device in the cylinder to force the cleaning liquid through the stem when the latter is held in position by the plug.

2. A cleaner as claimed in claim 1 in which the plug is in the bush and is formed of compressible material to obtain an air and liquid tight-joint with the bush when holding the stem in position for cleaning, and gland-nut means for effecting said compression.

3. A cleaner as claimed in claim 1 in which the piston device has a threaded stem operable by a threaded tubular member having a rotary movement engaging said threaded stem.

RICHARD ROLAND CROFT.